United States Patent [19]

Schlamann et al.

[11] 4,245,722
[45] Jan. 20, 1981

[54] VEHICLE DISK BRAKE WITH IMPROVED MEANS FOR CHANGING BRAKE PADS

[75] Inventors: Wilhelm Schlamann, Isernhagen; Joachim Feldmann, Neustadt; Erich Reinecke, Beinhorn, all of Fed. Rep. of Germany

[73] Assignee: Wabco Fahrzeugbremsen GmbH, Hanover, Fed. Rep. of Germany

[21] Appl. No.: 929,063

[22] Filed: Jul. 28, 1978
(Under 37 CFR 1.47)

[51] Int. Cl.³ .............................................. F16D 55/10
[52] U.S. Cl. ................... 188/71.4; 188/73.6; 188/366
[58] Field of Search ............... 188/71.4, 71.5, 366, 188/73.6; 192/85 AA

[56] References Cited

U.S. PATENT DOCUMENTS

| 3,124,216 | 3/1964 | Buyze | 188/71.4 |
| 3,240,292 | 3/1966 | Klaue | 188/71.4 |
| 4,054,189 | 10/1977 | Klaue | 188/366 X |

FOREIGN PATENT DOCUMENTS 2526403 12/1976 Fed. Rep. of Germany .
2706115 8/1978 Fed. Rep. of Germany .

Primary Examiner—Douglas C. Butler
Attorney, Agent, or Firm—R. S. Visk; R. W. McIntire, Jr.

[57] ABSTRACT

A disk brake assemblage providing an improved arrangement whereby the brake pads and supports therefore may be changed with a minimum amount of disassembly of the disk brake assemblage. The brake assemblage is provided with an annular cylinder and an annular piston operable therein and comprising a brake cylinder device operably disposed between a pair of backing plates and brake pads which are adapted to frictionally engage respective brake disks or rotors. Both the cylinder and the piston are provided with axially projecting lugs or members normally engaging correspondingly formed recesses on the brake pad backing plates for retaining the brake pads and plates in the operable position. By axially squeezing or displacing the cylinder and piston toward each other, the lugs are displaced out of the recesses to permit the brake pads and backing plates to be removed and replaced.

9 Claims, 14 Drawing Figures

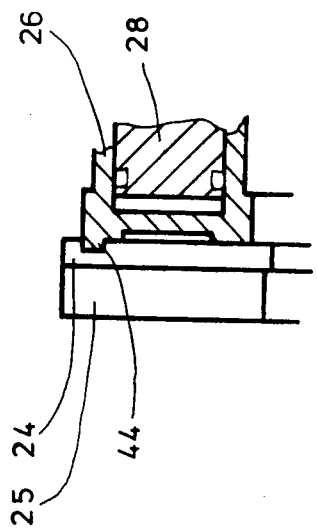
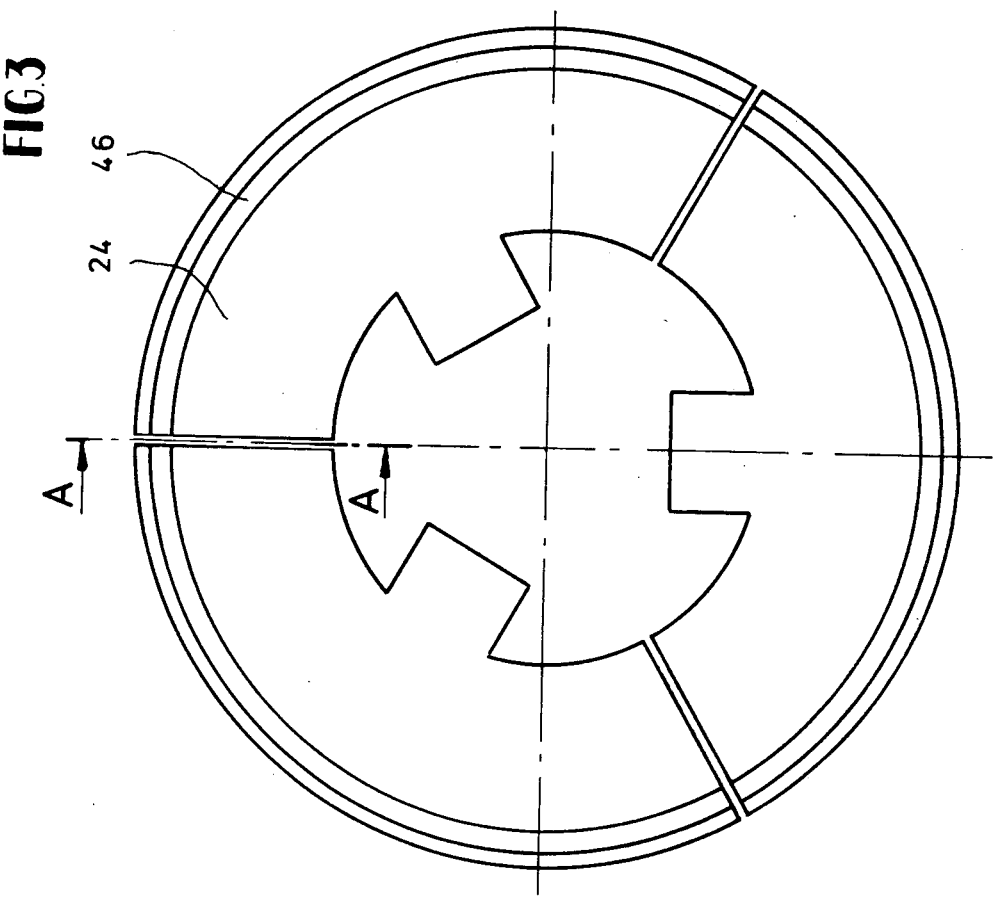

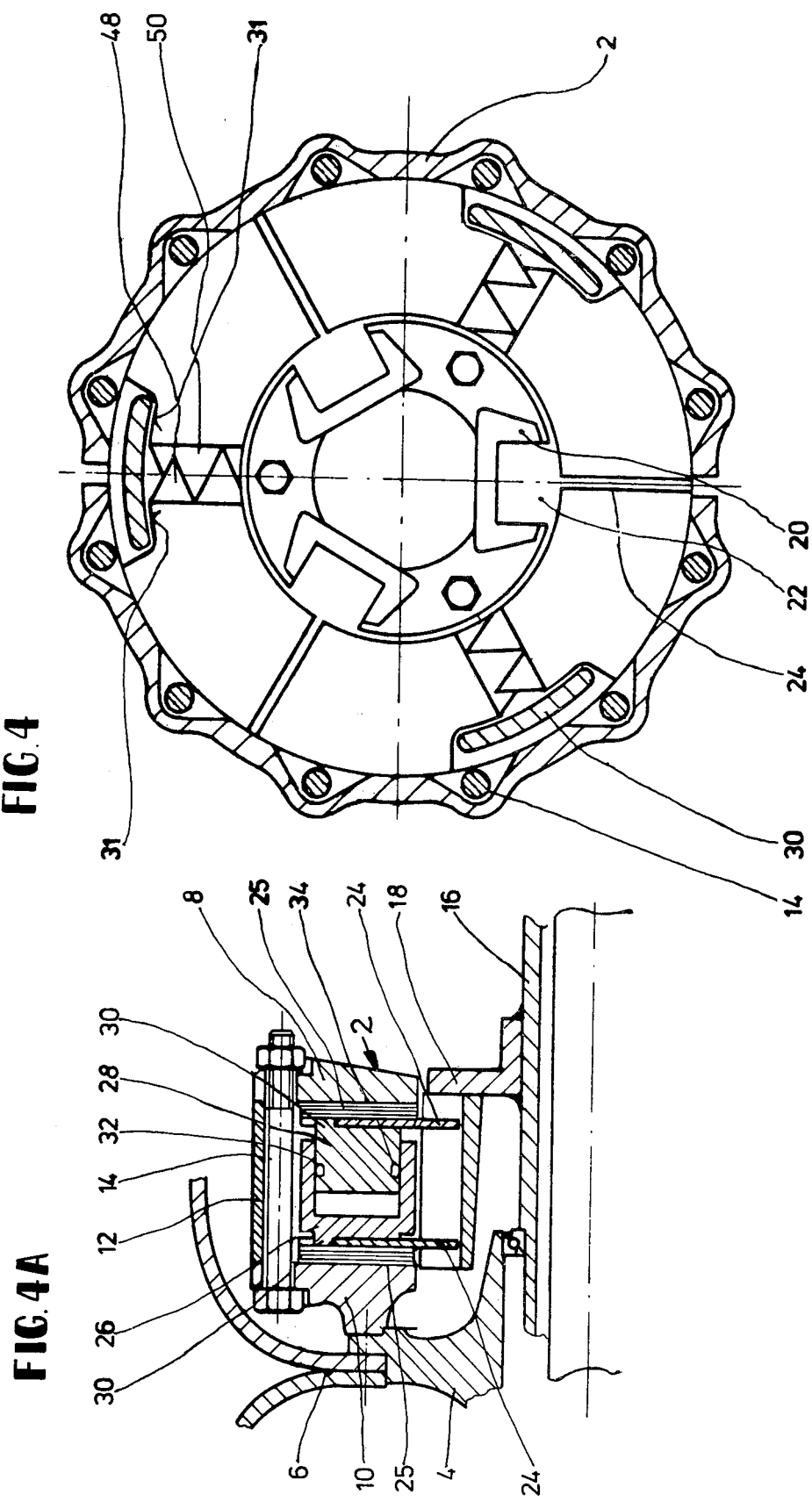

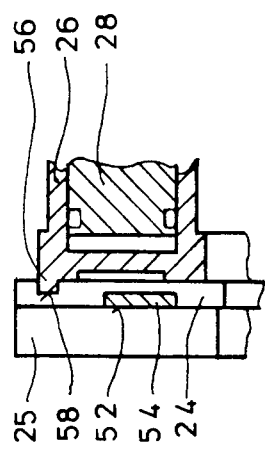
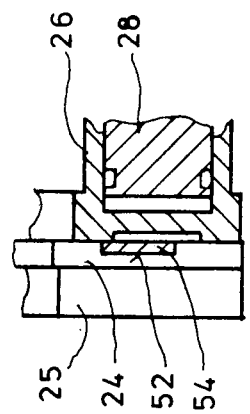
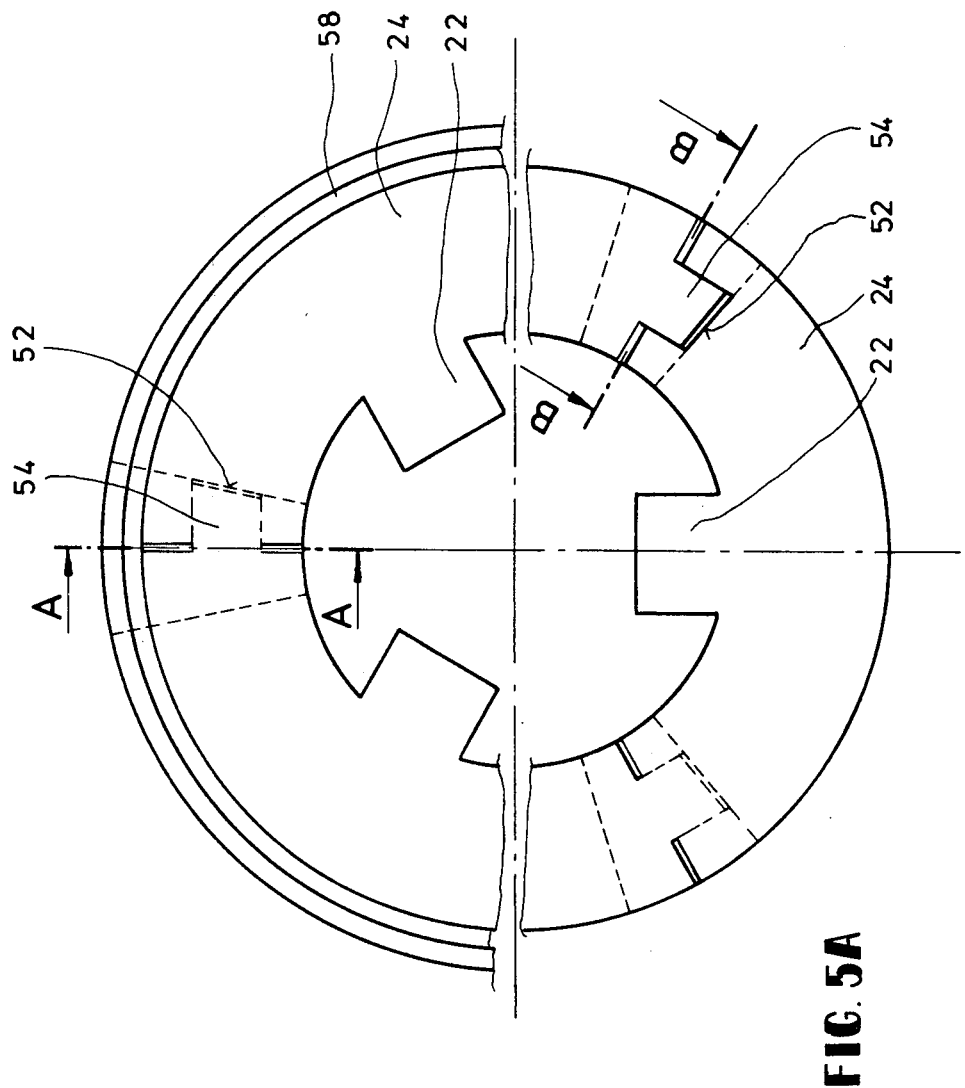

VEHICLE DISK BRAKE WITH IMPROVED MEANS FOR CHANGING BRAKE PADS

BACKGROUND OF THE INVENTION

A full pad disk brake with a rotating housing is presently disclosed in Ger. Pat. 2526403 in which the pads are extracted from the outside for changing thereof. This known disk brake has the disadvantage, however, of having relatively many movable parts which must first be removed or displaced to allow for adjustment and loosening of the pads, and of having only part of the surface of the backing plates fitted with pads because the pad segments are movable by providing respect to each other only with a certain angular clearance therebetween.

SUMMARY OF THE INVENTION

The object of the present invention, therefore, is to provide an improved full disk brake of the sort mentioned above and structurally arranged in such a way that changing pads is simplified while at the same time making complete use of the surface of the disk.

This task is accomplished with a full disk brake of the sort mentioned initially by providing relatively axially movable annular cylinders and pistons surrounding the axle so that, upon relative axial displacement or squeezing together of the cylinder and piston, the brake pads and backing plates may be removed. Such arrangement thus insures against drop out of the brake-pad backing plates in the operating state, especially on the external periphery. After axial displacement, which can be effected inwardly from the backing plates or on one pad backing plate, the pad backing plates are released and need only be removed and changed. In this way one achieves considerable simplification of the assembly and disassembly. A further advantage is that these devices simultaneously absorb torque during braking action.

From the standpoint of simple manufacture and a decrease in the number of movable parts, in accordance with a practical and advantageous further development of the invention, the pads and their backing plates are rigidly, but removably, connected to the operating cylinder-piston device through a lug and recess arrangement which releases the brake-pad backing plates and pads when the cylinder-piston device is compressed or axially squeezed together. In accordance with the invention, the lug and recess arrangement comprises a plurality of angularly spaced lugs formed on the piston and axially projecting into correspondingly located recess formed in the brake-pad backing plates. The recesses provide ample clearance for the lugs so as to provide for satisfactory adjustment of the brake-pad backing plates in the assembled state.

With the utilization of the lug and recess arrangement, such arrangement could be further modified by having the recesses or holes formed in grooves disposed coaxially relative to the brake-pad backing plates in order to keep the cylinder-piston device independent of the braking force and in order that tension arising from thermal expansion in the brake pads not be transmitted to the pins and, thereby, to the cylinder-piston device.

BRIEF DESCRIPTION OF THE DRAWINGS

FIG. 1A is a fragmentary elevational view, in section, taken through FIG. 1.

FIGS. 3 and 3A show a further modification of the disk brake shown in FIGS. 1 and 2.

FIGS. 4 and 4A show modifications of one component of the disk brake shown in FIGS. 1 and 1A.

FIGS. 5, 5A, 5B, and 5C show alternative arrangements of brake pads and brake-pad braking plates relative to each other.

DESCRIPTION AND OPERATION

Figure 1:
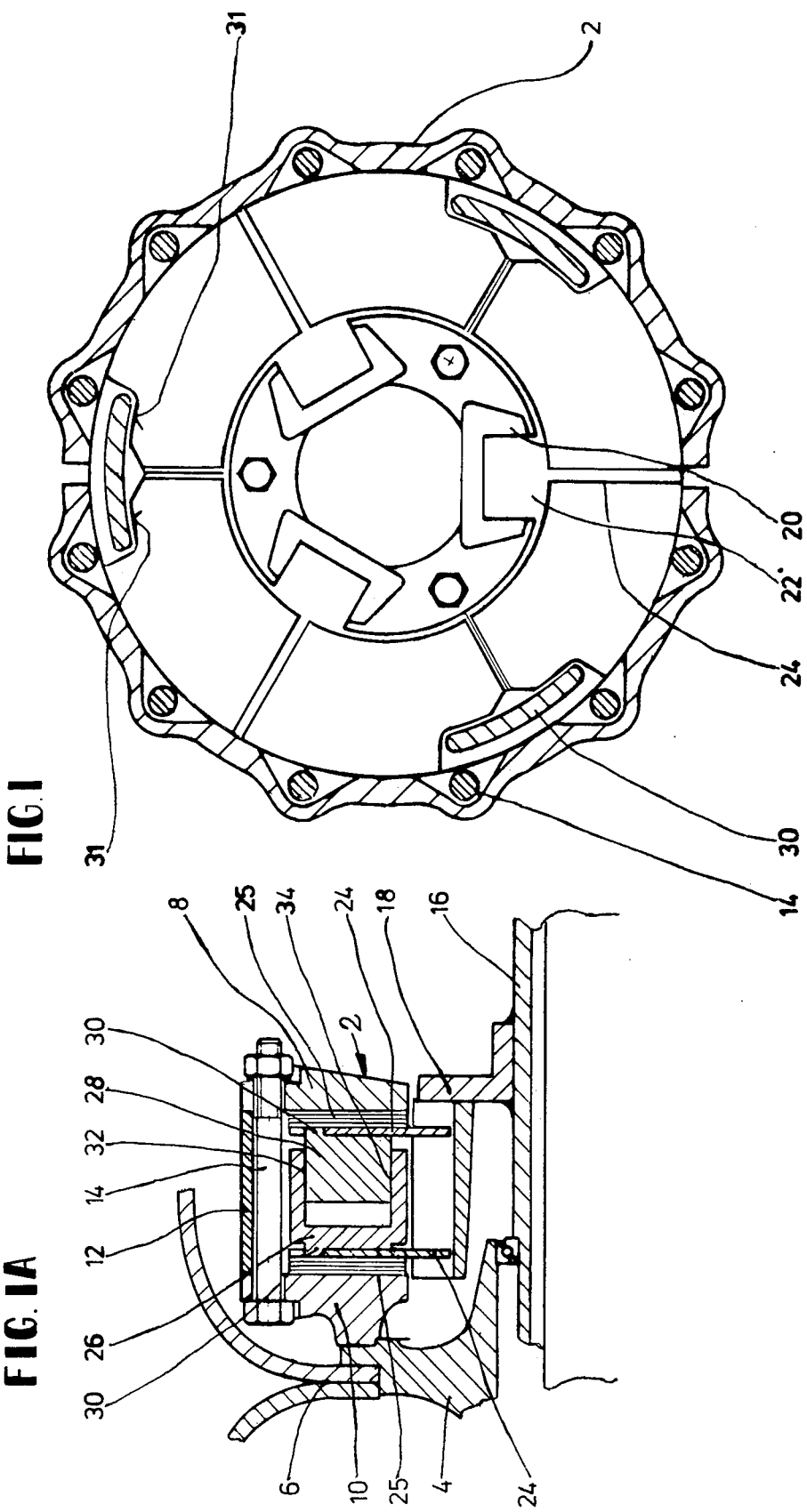
FIG. 1 is an elevational sectional view of a disk brake embodying the invention and coaxially surrounding a wheel axle.

In FIGS. 1 and 1A, showing one form of the disk brake according to the invention, the reference number 2 indicates a brake housing connected to a hub 4 of a vehicle wheel 6. The brake housing 2 consists of two ribbed disks or rotors, 8 and 10, fitted with releasable connecting parts or spacers 12 disposed between oppositely facing bolt flanges through which screws 14 are passed for holding the two halves of the housing, disks 8 and 10, together. On a non-rotating axle housing 16, an annular support flange or ring 18 with U-shaped axial extensions 20 is mounted, which extensions are engaged by complementarily angularly spaced rectangular radial extensions 22 formed on oppositely facing annular brake-pad brackets or backing plates 24 holding respective brake pads 25. On the external periphery of an annular cylinder 26 in which an annular piston 28 is operably disposed, a plurality of angularly spaced (relative to the wheel 6) arcuate projections or lugs 30 is provided so as to engage with correspondingly located cutouts 31 or recesses formed in the outer braking plate 24, thus locking the brake-pad backing plates against radial as well as angular displacement. The friction between contact surfaces 32 and 34 of cylinder 26 and piston 28 is adjusted so that said piston cannot move in the annular cylinder 26 except under externally applied force. Cylinder 26 and piston 28 comprise a piston device which may be conventionally operated by either air or hydraulic pressure supplied to or released from a chamber formed between said cylinder and piston.

To change the brake-pad backing plates 24 with the brake pads 25, the piston 28 and the cylinder 26 are compressed or squeezed together and forced in toward the inner housing disk 10, whereby the lugs 30 on the piston 28 are displaced out of recesses 31 to release the adjacent brake-pad backing plate 24. After removal of the connecting parts or spacers 12 by way of openings between crosspieces (not shown), the brake-pad backing plates 24 and pads 25 may be removed and changed.

After the brake-pad backing plates 24 and pads 25 have been changed, one application of the brake is sufficient to move the cutouts or recesses 31 in the brake-pad backing plates 24 into registry with the lugs 30, thus making the brake ready for operation. Loosening of additional parts is no longer necessary.

Figure 2:
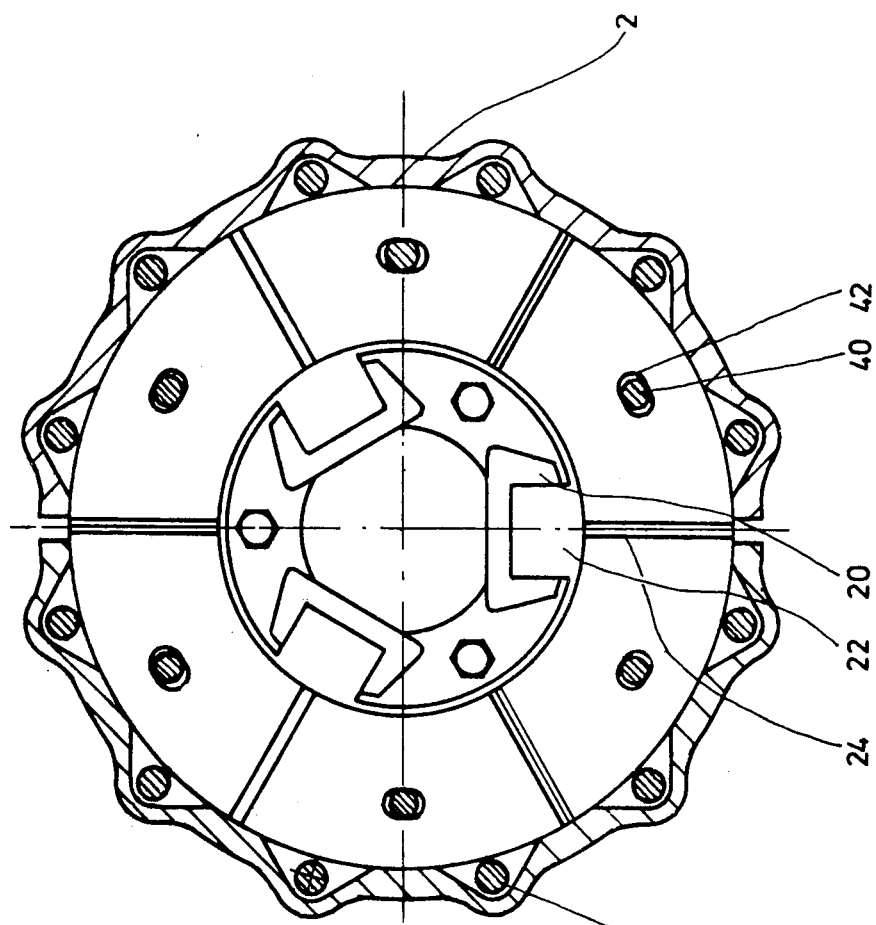
FIG. 2 is an elevational view of a modified embodiment of the disk brake shown in FIG. 1.
Figure 2A:
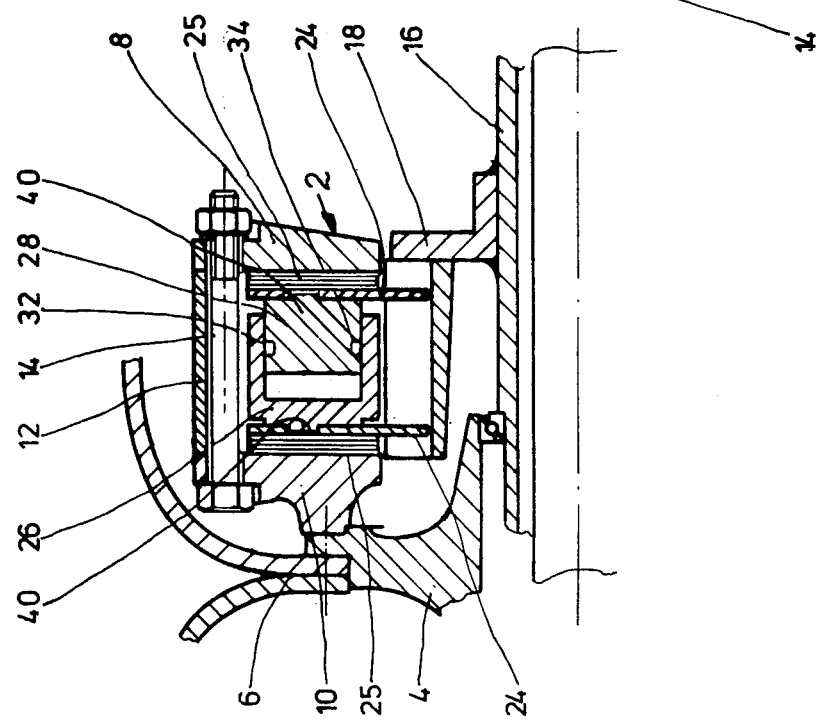
FIG. 2A is a fragmentary elevational view, in section, taken through FIG. 2.

FIGS. 2 and 2A show a further form of the disk brake according to the invention. The disk brake represented here corresponds to that of FIGS. 1 and 1A in construction, except that the lugs 30 of the clamping device are replaced with a plurality of pins or projections 40, and in the brake-pad backing plate 24, a plurality of correspondingly located recesses 42 are provided into which the projecting pins may be received. For the sake of simplification, the other parts, which correspond to the other parts of FIG. 1, are marked with the same reference numbers as in FIG. 1, and with regard to the description, reference is made to FIG. 1.

When a brake application is effected, the braking forces occurring during such braking exert a torque on the brake pads 25 and, therewith, on the brake-pad backing plates 24. Such torque attempts to rotate the brake-pad backing plates 24 peripherally about the U-shaped extensions 20. In the form of execution according to FIG. 1, this torque is absorbed by the lugs 30 and the reciprocal support of the brake-pad backing plates 24. Beyond this, as mentioned, the lugs 30 inhibit radial displacement of the brake pads 25 and backing plates 24.

In the embodiment of the invention according to FIG. 2, the bolts 40 take over the radial protection and the absorption of the torque. By the choice of oblong holes or recesses 42 instead of round holes, the danger of meshing is avoided and a definite power absorption is achieved. The contact surfaces of the brake-pad support segments remain essentially free of forces among themselves.

In FIGS. 3 and 3A, a further embodiment of a disk brake according to the invention is represented. In this form of execution, the lugs 30 according to FIG. 1 and the pins 40 according to FIG. 2 are replaced by a closed, radially projecting ring 44 engaging a complementary peripheral annular groove 46 formed in the brake-pad backing plates 24. The brake-pad backing plates, the brake pads, the annular cylinder, and the annular piston are again designated by the reference numbers 24, 25, 26, and 28, respectively. In the form of execution according to FIG. 3, the projecting ring 44 protects against dropout of brake-pad backing plates and brake pads as well as absorption of torque acting thereon. The ring 44 can be replaced by several arcuate segments, and the annular groove 46 by several arcuate recesses formed so as to be complementary to the ring segments.

In the embodiment according to FIG. 2, incidentally, the U-shaped extensions 20 are connected by bolts and the brake-pad backing plates on the one side with the housing and on the other side with the clamping device by force-fit for the purpose of the pad mounting. This can lead to increased friction by tilting, for example, of the piston 28 of the clamping device in the housing.

In FIGS. 4 and 4A, a further embodiment of the disk brake according to the invention is shown that avoids the above danger of increased friction in that the brake-pad backing plates 24 are fitted on the opposite contact surfaces with teeth 48 and 50 that engage each other. Tilting of the brake-pad backing plates, which would effect a relative movement on the contact surfaces, is avoided by this measure. The torque is absorbed by the brake-pad backing plates among themselves, so that no forces are exerted on the other components by the tilting. The direction of the flanks of the teeth is chosen in such a way that it corresponds to the slide-in direction of the brake-pad backing plates, thus guaranteeing simple changing.

Since the form of execution according to FIG. 4 otherwise is constituted like the disk brake according to FIG. 1, identical components are given identical reference numbers, and for further description reference can be made to FIG. 1.

In FIGS. 5, 5A, 5B, and 5C, two further forms of the disk brake according to the invention are represented; components that correspond to those of the disk brake according to FIGS. 1 to 4 are given the same reference numbers.

Both disk brakes according to FIG. 5 are distinguished from the disk brakes according to FIGS. 1 to 4 in that the brake-pad backing plates 24 fitted with the brake pads 25 are furnished with rectangular cutouts or recesses 52 and rectangular lugs 54, in which the lugs of one brake-pad backing plate engage in the cutouts of the neighboring backing plate.

The disk brake according to FIGS. 5 and 5B, like the disk brake according to FIG. 3, has peripheral, axially projecting annular ribs 56 on the annular cylinder 26 that engage in complementarily disposed peripheral annular grooves 58 formed in the brake-pad backing plates 24.

In the form of the invention according to FIGS. 5A and 5C, ribs 56 and grooves 58 are eliminated.

By means of the cutouts 52 and the lugs 54 reciprocal support of the brake-pad backing plates 24 is achieved again, as in the form according to FIG. 4. Since the lateral flanks of the cutouts 52 and the lugs 54 run at an angle to the slide-in direction, protection against dropout in the unbraked state is accomplished without further measures. In the form according to FIGS. 5 and 5B the protection against dropout in the unbraked state is of course better, since ribs 56 and slots 58 are provided. The undercuts, i.e., the cutouts 52 and the lugs 54, in the brake-pad backing plates are now constructed in such a way that on compression or squeezing together of piston 28 and cylinder 26, the brake pads are released as a whole in the sequence (with reference to FIGS. 5 and 5A) upper left backing plate segment, lower backing plate segment, upper right backing plate segment.

In order to avoid the nonuniform transmission of forces to the brake-pad backing plates 24 on braking, portion of said brake-pad backing plate can be cut out in the area of the rectangular cutouts 52 and lugs 54, as is indicated by the broken lines in FIGS. 5 and 5A.

Figure 6:
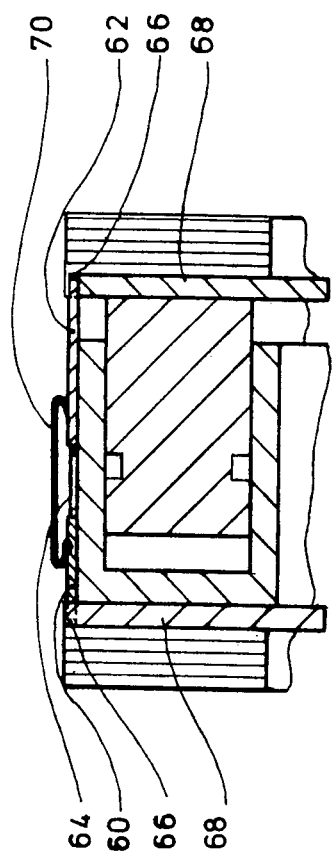
FIGS. 6 and 7 are modifications in the manner of assembly of disk brakes embodying the invention.
Figure 7:
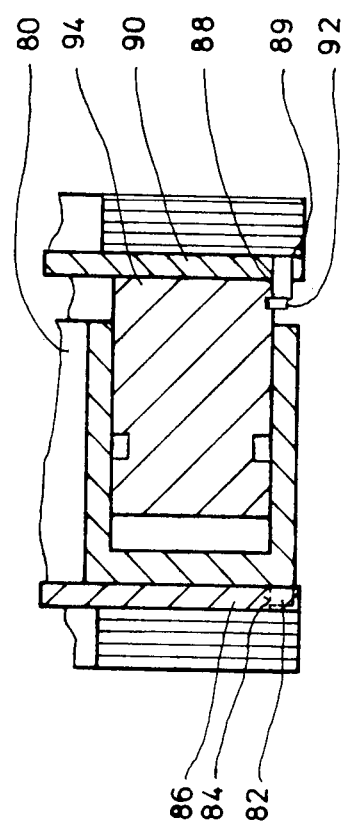

In FIGS. 6 and 7, two further forms of the disk brake according to the invention are represented.

In the disk brake according to FIG. 6, the spacer 12, as shown in FIG. 1A, is replaced by a spacer formed in two annular parts 60 and 62 axially spread apart by a spring 64, the external edges of said spacer fitting into grooves 66 in the brake-pad backing plates 68. The area of the spring is preferably protected by a sealing cover 70. The brake-pad backing plates 68 are released for changing by axially squeezing together or toward each other the two parts 60 and 62 of the spacer.

In the disk brake according to FIG. 7, the clamping device comprises an annular cylinder 80, provided with an axially projecting peripheral annular rib 82 that engages a complementarily formed groove 84 in a brake-pad support 86. On the opposite side, a tubular part 88 is arranged in a correspondingly shaped slot 89 in a brake-pad backing plate 90 and is held by means of a suitable fastener 92, such as a snap ring, for example, that can be fixed in the annular piston 94. Changing proceeds simply by releasing the fastener 92 and by axially shifting part 88 leftwardly as viewed in FIG. 7, whereupon brake-pad backing plate 90 is cleared and may be removed then by squeezing together cylinder 80 and piston 94, that is, sliding annular cylinder 80 rightwardly, as viewed in the drawing, brake-pad backing plate 86 may be removed. Rib 82 and the portion of tubular part 88 engaging the groove 89 need not be constructed in the shape of a closed ring; individual ring segments or lugs distributed along the periphery can be provided that engage complementarily shaped cutouts in the brake-pad backing plates.

We claim:

1. A disk brake device for a vehicle wheel rotatably mounted on a non-rotating axle housing, said disk brake device comprising:
   (a) a brake housing formed by a pair of oppositely facing annular rotors with an annular spacer disposed therebetween adjacent the outer peripheries thereof for spacing the rotors in axially spaced-apart relation, each of said rotors having outer peripheral bolt flanges through which bolts extend from one to the other for securing the brake housing in assembled relation;
   (b) a pair of annular brake-pad backing plates disposed coaxially in said brake housing and each having secured thereon an annular brake pad disposed for making frictional contact with said rotors, respectively;
   (c) an annular support flange coaxially secured to said axle housing and having formed and angularly spaced thereon a plurality of cross-sectionally U-shaped members extending axially therefrom so as to axially subtend said rotors, said backing plates, and said brake pads;
   (d) each of said backing plates having formed on the inner peripheries thereof radially extending portions angularly spaced so as to coincide with and engage said U-shaped member for inhibiting rotation of the backing plates and brake pads secured thereto; and
   (e) an annular cylinder and piston assembly disposed between said backing plates and operable, when axially extended apart responsively to fluid pressure for causing said brake pads to apply retarding friction to said rotors, respectively,
   (f) said cylinder and piston assembly having projecting members extending axially therefrom so as to engage recesses correspondingly formed in the backing plates to inhibit angular and radial displacement thereof, said cylinder and piston being compressible relative to each other for effecting disengagement of the projecting members from the recesses and thereby removal of the backing plates and brake pads for replacement.

2. A disk brake device according to claim 1, characterized in that the projecting members are designed as axially projecting arcuate lugs for engaging correspondingly shaped recesses in the brake-pad backing plates when assembled.

3. A disk brake device according to claim 2, characterized in that the lugs are arranged approximately in the area of the outer peripheries of the brake-pad backing plates.

4. A disk brake device according to claim 1, characterized in that the projecting members are designed as axially projecting pins that engage arcuately elongated holes correspondingly formed in the brake-pad backing plates.

5. A disk brake device according to claim 1, characterized in that the axially projecting members are in the form of axially protruding rings which engage complementarily designed and located annular grooves in the brake-pad backing plates.

6. A disk brake device according to claim 5, characterized in that each axially protruding ring comprises a plurality of arcuate segments which engage complementarily designed and located arcuate grooves in the brake-pad backing plates.

7. A disk brake device according to claim 6, characterized in that the rings and grooves are disposed adjacent the outer peripheries of the cylinder and piston, and the brake-pad backing plates.

8. A disk brake device according to claim 1, characterized in that the projecting members are in the form of teeth designed on the sides of the brake-pad backing plates facing each other, which mesh with each other.

9. A disk brake device according to claim 8, characterized in that the flanks of the teeth lie reciprocally in radial direction of removal of the adjacent brake-pad backing plates.

* * * * *